US00RE33985E

United States Patent [19]

Glover

[11] E Patent Number: Re. 33,985

[45] Reissued Date of Patent: Jul. 7, 1992

[54] SLACKLESS ROTARY DRAWBAR ASSEMBLY

[75] Inventor: Mary A. Glover, Pittsburgh, Pa.

[73] Assignee: McConway & Torley Corporation, Pittsburgh, Pa.

[21] Appl. No.: 685,300

[22] Filed: Apr. 12, 1991

Related U.S. Patent Documents

Reissue of:

[64] Patent No.: 4,966,291
Issued: Oct. 30, 1990
Appl. No.: 395,960
Filed: Aug. 18, 1989

[51] Int. Cl.[5] ..... B61G 9/00

[52] U.S. Cl. ..... 213/71; 213/62 A; 213/62 R

[58] Field of Search ..... 213/50, 61, 62 A, 62 R, 213/69, 71, 72, 75 R, 78

[56] References Cited

U.S. PATENT DOCUMENTS

| | | | |
|---|---|---|---|
| 2,241,353 | 5/1941 | Kinne et al. | 213/71 X |
| 2,327,240 | 8/1943 | Barrows et al. | 213/71 |
| 3,716,146 | 2/1973 | Altherr | 213/75 R |
| 4,336,758 | 6/1982 | Radwill | 105/420 X |
| 4,456,133 | 6/1984 | Altherr et al. | 213/62 R |
| 4,555,033 | 11/1985 | Miller | 213/62 R X |
| 4,580,686 | 4/1986 | Elliott | 213/62 A |
| 4,700,854 | 10/1987 | Chadwick | 213/62 R |
| 4,946,052 | 8/1990 | Kaim et al. | 213/62 R X |
| 5,000,330 | 3/1991 | Kaim et al. | 213/62 R |

*Primary Examiner*—Robert J. Oberleitner
*Assistant Examiner*—Alfred Muratori
*Attorney, Agent, or Firm*—Armstrong, Nikaido, Marmelstein, Kubovcik & Murray

[57] ABSTRACT

The present invention provides a slackless rotary drawbar assembly of simple yet rugged construction. The drawbar assembly preferably consists of five parts: a rotary drawbar, a rotary drawbar support housing, a bottom support casting, a rear support block, and a slack adjustment wedge. The rotary drawbar support housing is welded into the center sill of a railroad car and supports the rotary drawbar so as to permit unrestricted universal movement of the drawbar through the range of movement required under normal operating conditions. The rotary drawbar has an enlarged truncated convex spherical end portion which mates with concave surfaces formed in the support housing and the bottom support casting. The bottom support casting is secured to the center sill and holds the drawbar in the support housing. The truncated convex spherical end portion also mates with a concave surface formed in the rear support block. A rear tapering surface of the rear support block is engaged by a mating gravity-activated wedge which is arranged to move vertically to compensate for wear and to maintain a slackless relationship of the parts that interconnect the drawbar with the train car. The assembly of the present invention provides an economy in design by reducing the number of parts required to obtain the advantages of prior art slackless rotary drawbar assemblies. Furthermore, the present invention is less subject to damaging friction and premature part wear and is more easily and accurately assembled and disassembled than prior rotary drawbar assemblies.

14 Claims, 5 Drawing Sheets

SLACKLESS ROTARY DRAWBAR ASSEMBLY

Matter enclosed in heavy brackets [ ] appears in the original patent but forms no part of this reissue specification; matter printed in italics indicates the additions made by reissue.

This application is related to U.S. patent application Ser. No. 352,932, filed May 17, 1989, still pending and having a common assignee and inventorship herewith.

BACKGROUND OF THE INVENTION

1. Field of the Invention

This invention relates to a drawbar assembly for connecting together railroad cars, in general, and, more particularly, to a drawbar arrangement embodying a simplified construction and arrangement of parts that includes a drawbar with a truncated convex spherical end contained between a front draft bearing surface formed integrally with a drawbar support housing which is secured to a center sill and a rear support block which is supported against the housing by a gravity-activated wedge.

2. Description of the Prior Art

As is known, most prior art railroad coupler assemblies are relatively complicated and include a draft sill, draft gear, yoke, follower block, striker, pin or coupler connection and the coupler itself and its associated components. Such conventional coupler arrangements have a degree of free and cushioned slack. That is, there is a certain amount of free "play" between the coupler components when the load changes from a draft to a buff load, and vice versa. At the same time, the draft gear acts as a spring mechanism to cushion impacts between adjacent cars. Research has indicated that eliminating the free and cushioned slack within a train can eliminate over the road train action forces due to "run-ins" and "run-outs". The magnitudes of these forces are large and cause significant wear and tear on the rolling stock and in some instances are severe enough to cause derailments.

Furthermore, in conventional coupler assemblies, the key or pin connection of the coupler to the yoke is at a relatively long distance from the kingpin about which the wheel truck rotates. In negotiating curves, particularly under buff loading conditions, this gives rise to relatively large lateral forces which can cause derailments. The same is true when jackknifing occurs under buff loads with lateral forces attempting to rotate the cars about their centers.

An improvement to the aforesaid conventional coupler assemblies was disclosed in U.S. Pat. No. 4,580,686, the disclosure of which is incorporated herein by reference. While not limited thereto, that patent, as well as the present invention, was particularly adapted for use in unit train applications where cars are coupled and uncoupled for periodic maintenance and repair only. Such cars are not subjected daily to impact forces associated with bumping encountered in classification yards and, therefore, do not require cushioning devices such as draft gears.

Specifically, that patent provided a drawbar arrangement for coupling railroad cars each having a center sill and trucks at its opposite ends, the trucks being pivotal about vertical kingpins. The arrangement included a drawbar having an enlarged spherical butt end portion defining essentially convex spherical buff and draft load surface, a rear support block having a tapered rear surface and concave substantially hemispherical buff load bearing surface adapted to engage with the convex buff load bearing surface of the butt portion, a slack adjusting wedge for engaging the tapered surface of the rear support block, means for transferring buff loads from the slack adjusting wedge to the center sill, a front draft block having a concave and substantially hemispherical draft load surface adapted to engage with the convex draft load surface of the enlarged spherical butt end portion, the front draft block including an annular draft load surface opposite the hemispherical draft load surface thereof, a wear block having an annular draft load surface adapted to engage the annular draft load surface of the front draft block, and means supported by the center sill for transferring a draft load from the wear block to the center sill.

Preferably, the drawbar arrangement of U.S. Pat. No. 4,580,686 provided that the draft block and the wear block each have an opening wherein the shank of the drawbar extended in a direction which was generally opposite the kingpin. The aforesaid means supported by the center sill included a plurality of draft stop lugs supported by the center sill. A sill bottom plate was preferably secured to the center sill for supporting one of the plurality of draft stop lugs. The center sill included spaced-apart sill side walls extending along opposite sides of a sill roof wall. The drawbar arrangement preferably further included a carrier plate supported by the center sill opposite the roof wall thereof for supporting the rear support block, front draft block and the wear block between the side walls of the center sill. The tapered surface of the slack adjusting wedge was preferably arranged to extend in a vertical direction along the height of the side walls of the outer sill. The tapered thickness of the wedge was greater at the top thereof than at the bottom for movement under the force of gravity between the rear support block and the lugs supporting the wedge on the center sill. An opening in the front draft block was preferably longer in the vertical direction than in the horizontal direction, whereby the draft front block rotated with the drawbar shank portion in a horizontal plane but not in a vertical plane. Moreover, the rear support block and front draft block rotated in an endless manner about an axis extending substantially along a central longitudinal axis of the shank relative to the convex spherical buff and draft load surfaces. The pivotal action at the end connections facilitated rotation, and permitted 360° rotation for negation of horizontal and vertical track curves as well as rotary car dumping.

With an arrangement of that sort, free and cushioned slack was eliminated form the interconnection between cars, thus eliminating undesirable longitudinal train action forces and reducing the risk of derailment. The slackless connection between cars provided thereby eliminated run-in and run-out of slack between cars in reversals of draft and buff train actions. That also eliminated the generation of large forces due to relative accelerations between cars, thus reducing wear and damage to car components, lading and locomotives, thereby reducing maintenance cost. The design of the drawbar reduced an estimated 650 pounds from the tare weight of the car and eliminated couplers, yokes, cushioning devices and strikers. At the same time, the structure forming the pivotal connection at each end of the drawbar could be incorporated into existing center sills without modification of the center sills. Moreover, the site at which the structure used to interconnect the end of the drawbar with the center sill could be located at any desired location but preferably rearwardly of the car to reduce lateral wheel force components. By moving the pivot point of the drawbar toward the center line of the bolster, car tracking through tight radius curves was enhanced while reducing the potential for track overturn plus wheel wear. That invention further utilized a gravity-activated wedge which was arranged to move vertically to compensate for wear and maintain a slackless relationship of parts that interconnected the drawbar with the car.

While the structure disclosed in U.S. Pat. No. 4,580,686 represented an improvement over prior conventional coupler assemblies, it required rather difficult assembly and disassembly and was subject to significant wear caused by friction.

For example, if either the front load bearing block or the wear block needed repair or replacement, a weld or other connecting means joining oppositely-directed shanks which formed the drawbar had to first be destroyed or otherwise removed to release the shanks from one another. The drawbar could then be removed from the center sill by removing the sill bottom cover plate which held the front and rear load bearing blocks about the enlarged spherical end portion of the drawbar. Once the drawbar was removed from the sill, the front block and/or the wear block were then slidably removed from the shank. Then, a repaired or a replacement front block and/or wear block was slid back onto the shank of the drawbar. Upon completion of the maintenance, the drawbar assembly was reassembled and the oppositely-directed shanks were then rewelded or otherwise connected to form a continuous drawbar.

Also, the large area of surface contact between the spherical butt end portion of the drawbar and mating spherical portions of the front draft block and rear buff block led to the creation of significant friction between and, consequently, premature wearing and failure of those contacting parts.

An advantage exists, therefore, for a slackless rotary drawbar assembly which is easily assembled and disassembled and which has a high degree of reliability.

It is therefore an object of the present invention to provide a slackless rotary drawbar assembly which is easily assembled and disassembled.

It is a further object of the present invention to provide a slackless rotary drawbar assembly having a reduced likelihood of premature wear and failure of its constituent parts.

Still other objects and advantages will become apparent in light of the attached drawings and written description of the invention presented herebelow.

SUMMARY OF THE INVENTION

The present invention provides a slackless rotary drawbar assembly of simple yet rugged construction. The drawbar assembly preferably consists of five parts: a rotary drawbar, a rotary drawbar support housing, a bottom support casting, a rear support block, and a slack adjustment wedge.

The rotary drawbar support housing is welded into the center will of a railroad car and supports the rotary drawbar so as to permit unrestricted universal movement of the drawbar through the range of movement required under normal operating conditions.

The rotary drawbar has an enlarged truncated convex spherical end portion which mates with concave surfaces formed in the support housing, the bottom support casting, and the rear support block. The bottom support casting is secured to the center sill and holds the drawbar in the support housing. A rear tapering surface of the rear support block is engaged by a mating gravity-activated wedge which is arranged to move vertically to compensate for wear and to maintain a slackless relationship of the parts that interconnect the drawbar with the train car. The assembly provides an economy in design by reducing the number of parts required to obtain the advantages of prior art slackless rotary drawbar assemblies. Furthermore, the construction according to the present invention is less subject to damaging friction and premature part wear and is more easily and accurately assembled and disassembled than prior rotary drawbar assemblies.

DESCRIPTION OF THE PREFERRED EMBODIMENT

Figure 1:
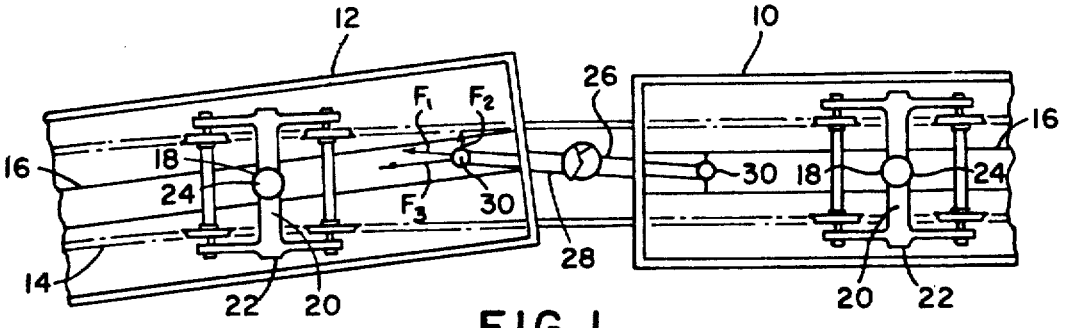
FIG. 1 (PRIOR ART)
FIG. 1 is a schematic illustration of a prior art railroad coupler arrangement showing the lateral forces which result under buff loads during negotiation of a curve.

With reference now to the drawings, and particularly to FIG. 1, there is shown adjacent railway cars 10 and 12, the car 12 being on a curved track section 14. Each car 10 and 12 includes a center sill 16 having a center plate 18 which reacts on the bolster 20 of a wheel truck 22. Extending through the center plate 18 is a kingpin, not shown, whose axis is indicated generally by the reference numeral 24 and about which the truck 22 can pivot in a horizontal plane. Interconnecting the two cars 10 and 12 are conventional couplers 26 and 28 which conventionally include a draft gear, a yoke, a follower block, and a pin or key coupler connection, the axis of the pin being indicated by the reference numeral 30. Each coupler can rotate in a horizontal plane about its associated pin connection 30.

With the cars 10 and 12 under a buff load with car 10 pushing the car 12, forces are imparted to the couplers 26 and 28. As can be seen in FIG. 1, the longitudinal force $F_1$ on the couplers is broken into a lateral force $F_2$ and a force $F_3$ which extends along the axis of the car. The lateral force $F_2$ exerts a sideways force on the truck 22 which is taken by the wheel flanges. The force $F_2$ also produces a moment about the kingpin 18 tending to twist the car about its center point. This lateral force produces relatively severe stresses in the car and in some cases can cause a derailment.

Figure 2:
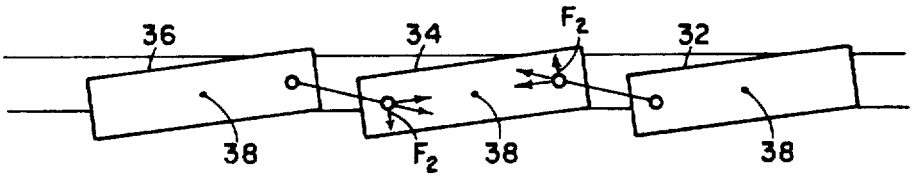
FIG. 2 (PRIOR ART)
FIG. 2 illustrates jackknifing motions and resultant forces exerted on railroad cars during buff loads.

In FIG. 2, a condition is illustrated wherein three cars 32, 34 and 36 are undergoing jackknifing motions under a buff load. Again, lateral forces $F_2$ are exerted on the cars at the connection of couplers 26 and 28 thereto, these forces tending to twist the cars about their center points or centers of gravity.

Figure 3:
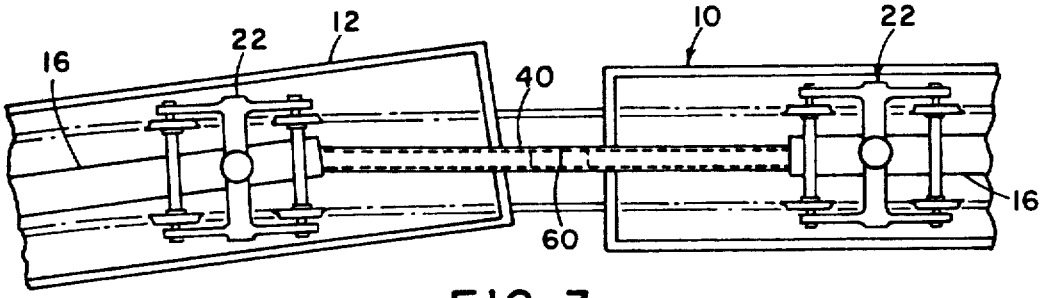
FIG. 3 (PRIOR ART)
FIG. 3 is a schematic illustration of a typical prior art slackless rotary drawbar arrangement.
Figure 4:
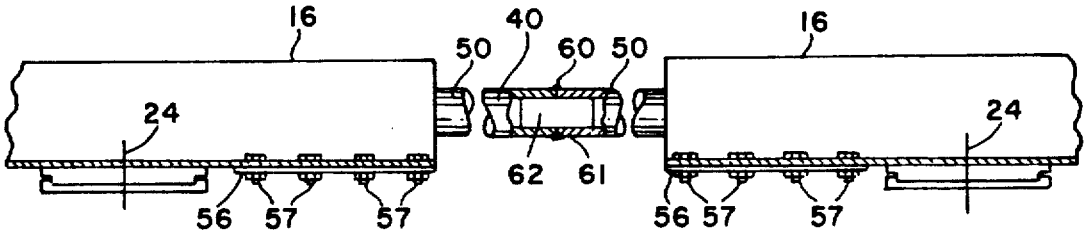
FIG. 4 (PRIOR ART)
FIG. 4 is an enlarged side view of the drawbar coupler arrangement of FIG. 3.

The drawbar arrangement of the aforementioned U.S. Pat. No. 4,580,686 is shown in FIGS. 3 and 4 wherein the couplers 26 and 28 of FIG. 1 are replaced by a drawbar 40 which is pivotally connected at the ends of center sills 16. The center sills 16 are preferably reduced in length so that the ends of the drawbar 40 pivot about axes which are as close as possible to the center 24 of trucks for the car. As a result, the distance between the longitudinal axis of the drawbar and the central axis of each car 10 and 12 is much less, resulting in a lower wheel flange to rail force produced by force $F_2$. In addition, there is a reduced moment about the kingpin whose axes are indicated by the reference numeral 24.

Figure 7:
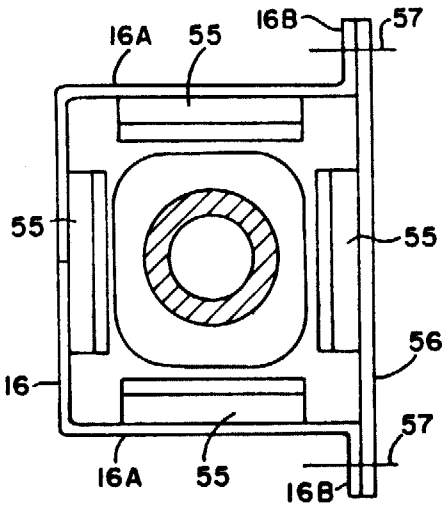
FIG. 7 (PRIOR ART)
FIG. 7 is a front elevational view of the prior art drawbar coupler arrangement shown in FIG. 5.
Figure 5:
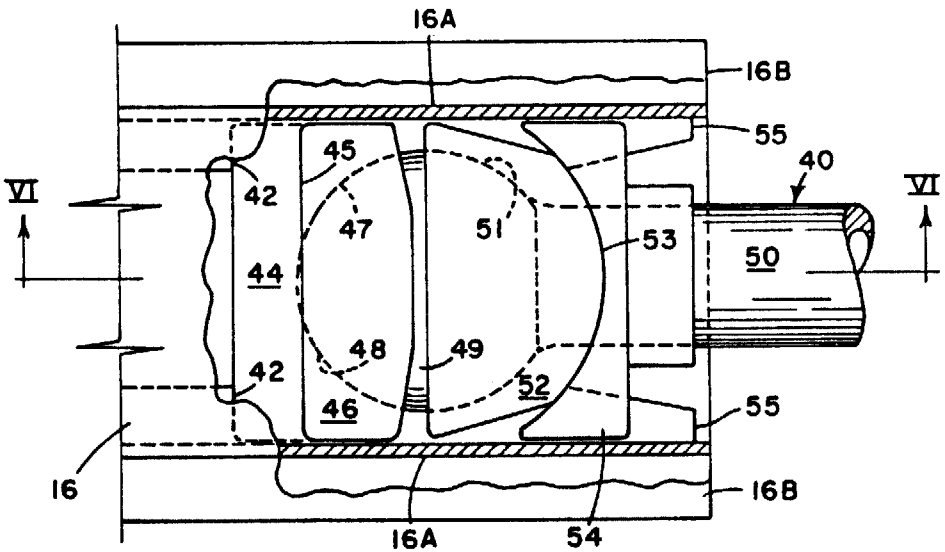
FIG. 5 (PRIOR ART)
FIG. 5 is a still further enlarged plan view of a prior art drawbar coupling arrangement.
Figure 6:
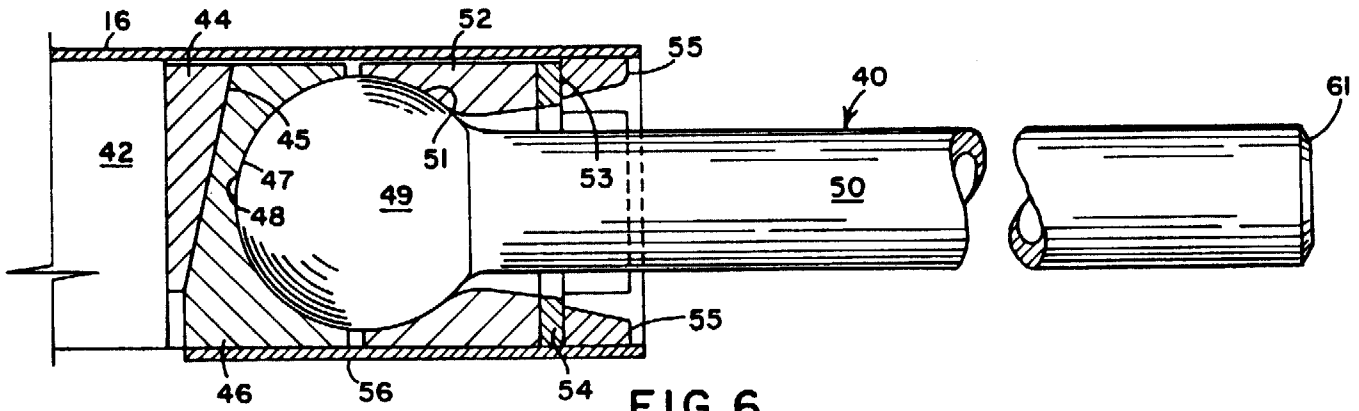
FIG. 6 (PRIOR ART)
FIG. 6 is an elevational view, in section, taken along line VI—VI of FIG. 5.

With reference now to FIGS. 5–7, a specific embodiment of the drawbar assembly according to U.S. Pat. No. 4,580,686 is shown. The end portion of the center sill 16 is illustrated and takes the form of a convention "z" sill. Rear draft lugs 42 are secured as by welding to spaced-apart side walls 16A of the Z-sill. A flange 16B project. laterally from the lower edge of each side wall 16A. A slack adjusting wedge 44 is seated against the rear draft lugs for supporting thereby. The wedge has a vertically-tapered surface 45 in contact with a mating tapered surface on a rear support block 46. The wedge is arranged so that the force of gravity acting on the wedge exerts a continuous force against the rear support block 46. The tapered surface on the rear support block is at the rear thereof and opposite this surface is a concave, substantially hemispherical buff load bearing surface 47 adapted to engage with a convex buff load bearing surface 48 forming part of a spherical butt end portion 49 at the end of drawbar 40. A shank 50 projects from a convex spherical draft load bearing surface 51 that is seated against a hemispherical draft load surface formed in a front draft block 52. An annular draft load surface 53 faces a forward direction which is opposite the rearwardly-directed hemispherical draft load surface of the front draft block. As shown in FIG. 5, the annular draft load surface is curved between the side walls 16A of the center sill and engages with a mating annular draft load surface defined on a wear block 54. The front draft block 52 and wear block 54 are each provided with an opening through which shank 50 extends.

The draft load which is transferred to the wear block is distributed to the center sill by means which in the embodiment shown in FIGS. 5–7, comprises a plurality of lugs 55. There are four lugs illustrated, one of which is welded to a top wall of the center sill to project downwardly into the space between the side walls 16A thereof and engages the forwardly-directed face of wear block 54. A second and third of the lugs 55 are welded to side walls 16A so that the lugs engage with the forwardly-directed face of the wear block. A fourth of the lugs is welded to a bottom cover plate 56, the latter being secured preferably by nut and bolt assemblies 57 to each of the flanks 16B. Thus, it can be seen that the lugs 55 extend from the side walls of the center sill and the bottom plate 56 into the space enclosed by the sill and the bottom plate. The faces of the lugs which are opposite each other are tapered so that the shank 50 of the drawbar can move back and forth in both the horizontal and vertical directions. The lugs efficiently transfer the pull forces from the drawbar by way of the front draft block 52 and wear block 54 to the center sill. Clearances between the rear support block 46 and the enlarged spherical butt end portion 49 are eliminated by the slack adjusting wedge 44 due to the continued force of gravity urging the wedge downwardly and thereby eliminating any clearances between the parts.

To transmit buff loads, the forces imposed on shank 50 are transferred by the rear support block 46 through the slack adjusting wedge 44 to the rear draft lugs 42 and thereby to the center sill. The tapering surface of the wedge is selected so that the wedge will not retreat vertically under the imposed forces, thereby consistently maintaining a metal-to-metal contact relationship between all of the parts situated between the rear draft lugs 42 and front draft lugs 55. Should it be necessary for the purpose of disassembling the drawbar to relieve the clamping force provided by the slack adjusting wedge 44, an instrument such as a pushbar (not shown) can be inserted at the rear edge of plate 56 into contact with lower edge of the wedge to displace it vertically.

The drawbar 40 in the embodiment of FIGS. 3 and 4 is formed in two shank halves 50 interconnected by a weld joint 60 which comprises a suitable layer of weld metal applied to a groove formed by chamfered surfaces 61 on the projected ends of the shank halves. A shaft member 62 extends between at the end faces of the shank halves to maintain a coaxial aligned relation during the welding process. Other means for interconnecting the shank halves can be used, if desired.

As one can readily appreciate, if either the front load bearing block 52 or the wear block 54 needed repair or replacement, the weld 60 (or other connecting means) which joined the oppositely-directed shanks 50 had to first be destroyed or otherwise removed to release the shanks 50 from one another. The drawbar 40 could then be removed form the center sill 16 by removing the sill bottom cover plate 56 which holds the front and rear load bearing blocks 52 and 46 about the enlarged spherical end portion 49 of the drawbar. Once the drawbar was removed from the sill, the front block 52 and/or the wear block 54 could then be slidably removed from the shank 50. Afterward, a repaired or replacement front block 52 and/or wear block 54 could be slid back onto the shank 50 of the drawbar. Upon completion of the maintenance, the drawbar assembly was reassembled and the oppositely-directed shanks 50 were then re-welded or otherwise connected to form a continuous drawbar.

As will be seen, the construction of the drawbar assembly of the present invention affords much simpler and less time-consuming maintenance to be performed on the drawbar assembly.

Also, when one considers FIGS. 5 and 6, it can be seen that virtually the entire surface area of the enlarged convex spherical portion 49 of the drawbar 40 is in contact with mating concave spherical surfaces formed on both the front and rear load bearing blocks 52 and 46. Such a large area of surface contact leads to the creation of significant friction between and, hence, premature wearing and failure of those contacting parts.

As will be described below, the construction according to the present invention greatly reduces the contact area between the spherical portion of the drawbar and the surfaces which contact and support the spherical portion to thereby greatly reduce the friction therebetween and the likelihood of premature wear and failure of those contacting parts.

Figure 8:
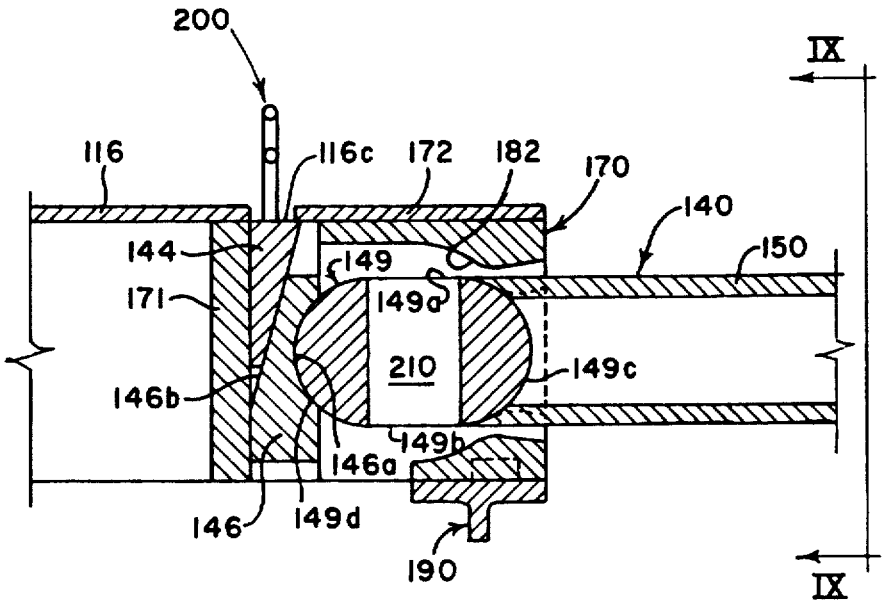
FIG. 8 is an elevational view, in section, of the slackless rotary drawbar assembly of the present invention as seen along the central longitudinal axis thereof.

Referring now to FIG. 8, there is depicted the slackless rotary drawbar assembly 140 constructed in accordance with the present invention. The assembly 140 includes a rotary drawbar support housing 170 which is welded or otherwise suitably secured into center sill 116. Support housing 170 includes a rear wall 171, top wall 172 and side walls 173 and 174. As most clearly seen in FIGS. 11 and 11A, top wall 172 has an aperture 172A formed therein, the function of which is described in greater detail hereinbelow.

Figure 11:
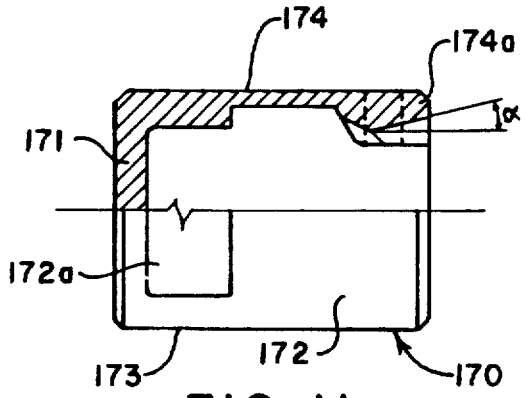
FIG. 11 is a plan view, in partial section, of the rotary drawbar support housing of the present invention.
Figure 11A:
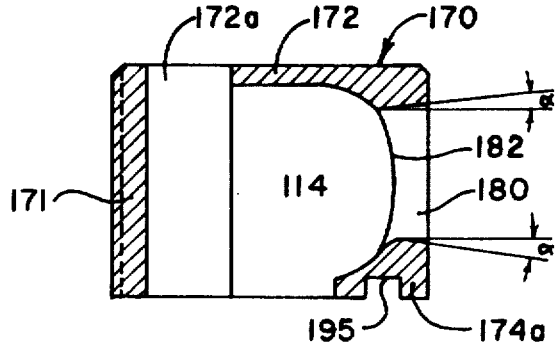
FIG. 11A is an elevational view, in section, of the rotary drawbar support housing of the present invention.

Along their lower portions and toward a forward region of the support housing 170 each of the side walls 173 and 174 has formed thereon a laterally inwardly protruding formation. One of these formations, as can be best seen in FIGS. 11 and 11A, is formed on side wall 174 and is represented by numeral 174A. An identical formation 173A is provided on side wall 173 in direct opposition to formation 174A and can be seen in FIG. 9.

Figure 9:
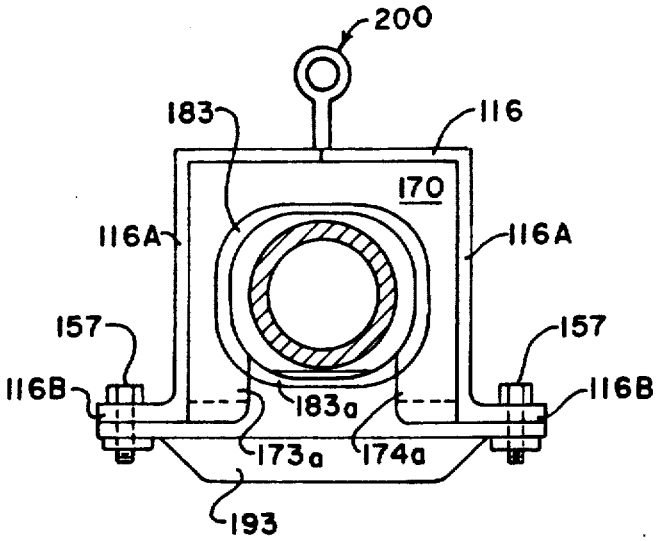
FIG. 9 is an end view of the assembly as seen along line IX—IX of FIG. 8.
Figure 12:
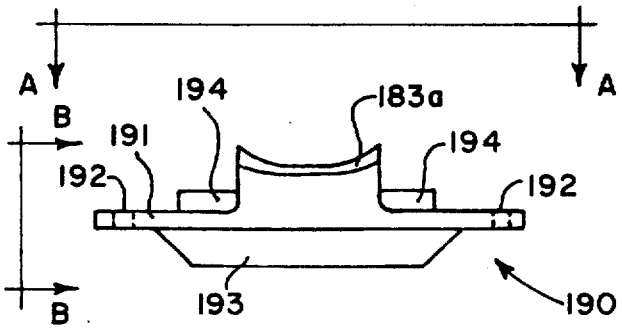
FIG. 12 a view of only the bottom support casting of the present invention as seen in the direction of the end view depicted in FIG. 10.
Figure 12A:
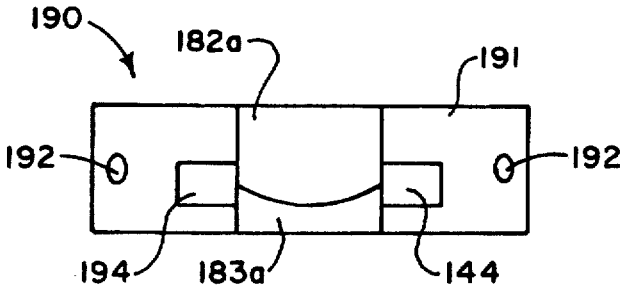
FIG. 12A is a plan view of the bottom support casting as seen along line A—A of FIG. 12.
Figure 12B:
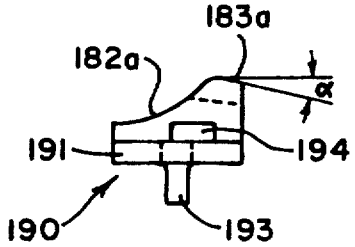
FIG. 12B is an elevational view of the bottom support casting as seen along line B—B of FIG. 12.

A space 180 is formed at the forward end of the support housing 170 between sidewalls 173 and 174. It is through space 180 that the shank 150 of the drawbar passes for connection with a similar but oppositely-directed drawbar shank 150 in a manner similar to that depicted in FIG. 4. A concave spherical surface 182 is formed in formation 173A, side wall 173, top wall 172, side wall 174 and formation 174A. As will be described in more detail hereinbelow, a complementary concave spherical surface 182A is provided on a bottom support casting 190 (FIGS. 12, 12A and 12B). When properly assembled, concave spherical surfaces 182 and 182A form a continuous concave draft loading surface. Bottom support casting 190 is preferably fastened by nut and bolt assemblies 157 to flanges 116B which project laterally outwardly from sidewalls 116A of the "z" sill 116 as illustrated in FIG. 9.

At such time when the bottom support casting 190 is not attached to the support housing 170, virtually the entire bottom of the housing 170 is open to receive an enlarged truncated convex spherical butt end portion 149 of the drawbar. When it is desired to secure the drawbar within the support housing 170, the truncated spherical portion 149 is positioned within the support housing and bottom support plate 190 is fastened by nut and bolt assemblies 157 to flanges 116B of sill 116. Except where it contacts the continuous surface formed by concave surfaces 182 and 182A and also where it contacts a rear support block 146, the butt end portion 149 is sized so as to form clearances between its outer surface and the inner surfaces of the top wall 172 and side walls 173, 174 of housing 170.

Figure 10:
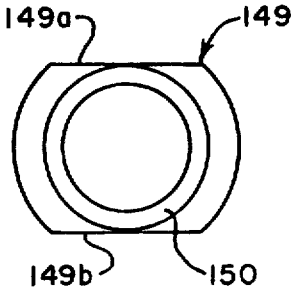
FIG. 10 is an end view of the rotary drawbar of the present invention as viewed axially along its shank portion.

As is most clearly seen in FIGS. 8 and 10, truncated spherical portion 149 is substantially oblate spheroidal in shape with truncated upper and lower portions formed by planar upper and lower surfaces 149A and 149B. A forward, substantially hemispherical, draft load bearing surface 149C of truncated convex spherical portion 149 is matingly received in the continuous ring-like concave draft load bearing surface formed by concave surfaces 182 and 182A. A similar rearward, substantially hemispherical, buff load bearing surface 149D of truncated convex spherical portion 149 is matingly received in a truncated concave spherical surface 146A formed in the rear support block 146.

Assembly of the drawbar assembly 140 is as follows. Oppositely-directed ends of shank halves 150 are first joined by welding or other suitable means to form a continuous drawbar in a manner similar to that illustrated in FIG. 4. Then, as noted previously, the truncated spherical portion 149 is positioned within the support housing 170 through the open bottom thereof and bottom support plate 190 is then fastened to flanges 116B of sill 116 by nut and bolt assemblies 157 in order to retain the truncated spherical portion 149 within the housing.

Rear support block 146 is then inserted simultaneously with slack adjustment wedge 144 upwardly through the open bottom of support housing 170 rearwardly of the buff load bearing surface 149D of the truncated spherical portion 149. During this step, the slack adjustment wedge 144 is held sufficiently upwardly relative to the rear support block 146 to permit unrestricted passage of the rear support block upwardly through the bottom of the housing until such time that its concave spherical surface 146B matingly receives convex spherical surface 149D. The wedge 144 is held upwardly by an operator who grasps a lifting ring 200 which is secured to the wedge and which passes through aperture 172A in top wall 172 of housing 170 as well as an aperture 116C formed in the top wall of the sill 116.

When the concave spherical surface 146B is in full contact with convex spherical surface 149D the wedge 144 is then lowered by the operator. The rear surface of the wedge 144 slides vertically relative to the forward surface of the rear wall 171 of support housing 170. The downward sliding of the wedge 144 under its own weight, and by additional means to be described herebelow, causes the tapered forward surface thereof to cooperate with the rearward tapered surface of the rear support block 146 in order to remove any slack which exists between the various parts of the drawbar assembly. The system thus operates in a manner analogous to that described above with regard to the prior art wedge and rear support block system illustrated in FIGS. 5 and 6. As with the prior art device, the tapering surface of the wedge 144 is selected to be at an angle such that the wedge will not retreat vertically under the imposed forces, thereby consistently maintaining a metal-to-metal contact relationship between all of the parts situated between and including the rear wall 171 and the concave surfaces 182 and 182A of the housing 170 and bottom support casting 190, respectively.

Referring again to FIGS. 8 and 9 and also the FIGS. 11, 11A, 12, 12A and 12B, it can be seen that the outer portion of the space 180 formed by support housing 170 and bottom support casting 190, through which shank 150 extends, forms a continuous flared or tapered surface. The portion of the continuous tapered surface on support housing 170 is designated as numeral 183 and the portion on bottom support casting 190 is designated as numeral 183A. The tapered surface increases the range of motion of the shank portion 150 of the drawbar as it moves universally across space 180. The angle of taper "α" ranges between about 7° and 13° with the greatest angle of taper being along the side portions of the continuous tapered surface to permit maximum lateral pivoting of the drawbar along particularly sharp bends in the rail track.

Advantageous features of the bottom support casting 190 and its connection to the support housing 170 are illustrated in FIGS. 8, 9, 12, 12A, and 12B. Casting 190 includes a base 191 having apertures 192 formed in opposite ends thereof. Fasteners such as nut and bolt assemblies 157 extend through apertures 192 and attach casting 190 to flanges 116B of sill 116. A rib 193 extends along the bottom surface of the base 191 to increase the rigidity and strength of the casting 190. Projecting upwardly from the upper surface of the base 191 are a pair of spaced lug means 194 which extend into and closely interlock with spaced mating pockets 195 formed in the bottom surfaces of the laterally inwardly protruding portions 173A and 174A of sidewalls 173 and 174, respectively. The interlock between lug means 194 and pockets 195 provides a locking lateral, vertical and axial interconnection between the casting 190 and the housing 170 to ensure the formation of a smooth, continuous concave spherical surface 182 and 182A for mating with the convex spherical surface 149C.

Figure 13:
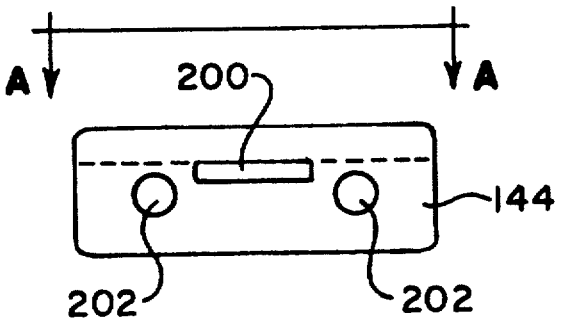
FIG. 13 is a plan view of the slack adjustment wedge of the present invention.
Figure 13A:
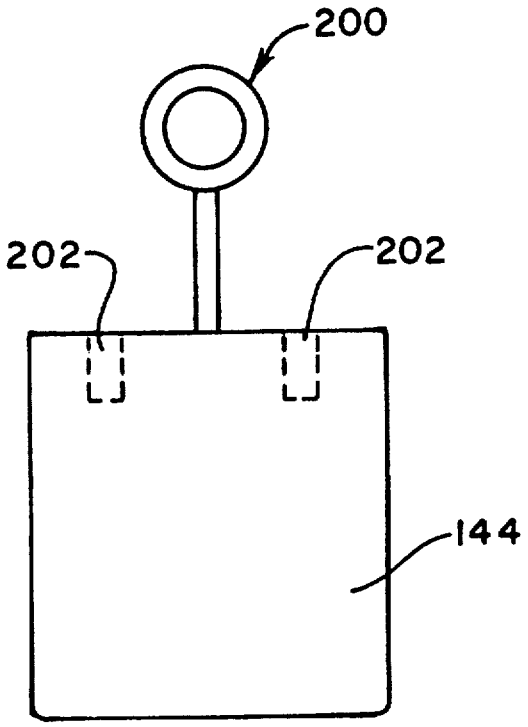
FIG. 13A is a view as seen along line A—A of FIG. 13.

In FIGS. 13 and 13A there are illustrated details of the slack adjustment wedge 144. As noted previously, the wedge has secured thereto and upwardly extending therefrom a lifting ring in the form of eyebolt 200. Lifting ring 200 further serves as a wear indicator means. The wedge 144 may further be provided, if desired, with bores 202 for receiving biasing means such as springs (not shown). The springs would bear against the undersurface of the sill 116 on either lateral side of the aperture 116C to bias the wedge 144 downwardly to further ensure that the wedge does not become vertically displaced and, hence, surface 149D from becoming dislodged from surface 146A under buff loading, draft loading and/or axial rotation forces exerted by the drawbar.

When maximum wear has occurred in the assembly 140 to where the wedge has "bottomed out", the wedge will have no more effect in eliminating additional slack. When this condition occurs, a colored wear indicator on the vertical portion of the eyebolt will no longer be visible above the sill. This will indicate that the system has to be adjusted, either by shimming, welding, or using an oversized wedge to take up any additional slack. When the system has to be adjusted, the wedge can be lifted up with the eyebolt to break the force between the parts. At such time, the rear support block 146 may be removed, followed by bottom support casting 190, and then the various parts of the assembly 140 can be easily modified or replaced as necessary.

An important advantage provided by the construction of the slackless rotary drawbar assembly 140 of the present invention is that eliminates the use of a separate draft bearing block assembly like blocks 52 and 54 depicted in FIGS. 5 and 6. As such, the present invention advantageously reduces the number of parts thus simplifying and enhancing the accuracy of the assembly and disassembly of the device.

Still further, the present invention completely eliminates the need for disconnecting the interconnected shank halves 150 in order to perform maintenance on the drawbar assembly. On the other hand, the shank halves 50 of the prior art drawbar assembly 40 had to first be disconnected from one another if repair or replacement of either the front draft load bearing block 52 and/or the wear block 54 was required. As one can readily appreciate, the present construction not only simplifies maintenance of the assembly but also reduces the time, labor and costs associated therewith.

Another advantage provided by the present construction is that it inherently requires less maintenance than the prior art device disclosed in FIGS. 5 and 6. As noted at the outset, and as can be clearly seen in a comparison of the drawbar assembly of the present invention as illustrated in FIG. 8 with that of the prior art as seen in FIG. 6, only a very small surface area of the truncated spherical portion 149 of the drawbar is in contact with the rear support block 146 and the housing 170; while in the prior art device virtually the entire outer surface area of the spherical end 49 of the drawbar is surrounded by and in contact with mating spherical surfaces on the draft and buff load bearing blocks 52 and 46.

Such a large area of surface contact between spherical buff end portion 49 and the mating spherical surfaces of the front draft block 52 and rear buff block 46 leads to the creation of significant friction between and, consequently, premature wearing and failure of those contacting parts.

By greatly reducing the area of contact between the truncated spherical portion 149 and the housing 170 and rear support block 146, the present construction thus eliminates a significant amount of damaging friction. Accordingly, the present construction reduces the frequency of maintenance associated with the repair or replacement of parts which are subject to premature wear or other friction-related heat damage.

Further enhancing this effect is the provision of a through-bore 210 (FIG. 8) extending between planar surfaces 149A and 149B of truncated spherical portion 149. With such a provision, air entering from the open bottom of the housing 170 is permitted to pass into the space above the upper planar surface 149A not only through the spaces formed between the outer surface of the truncated spherical portion 149 and the side walls 173, 174, but also through the through-bore 210.

Through-bore 210, in combination with the spaces formed between the outer surface of portion 149 and the side walls, 173, 174 permits air to at all times cool sizable portions of both the interior and exterior of the truncated spherical portion 149 to further resist friction-related heat damage to portion 149 as well as the parts in contact therewith.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

I claim:

1. A slackless rotary drawbar coupler assembly for a railway car having a center sill, said assembly comprising:

a drawbar having a shank portion extending to an enlarged truncated spherical butt end portion defining essentially convex spherical buff and draft load bearing surfaces, the shank portion projecting from said convex spherical draft load bearing surface;

housing means secured to said center sill for supporting said butt end portion therein, said housing means having a top wall, a rear wall and spaced side walls, said housing means further having an essentially entirely open bottom portion;

concave surface means formed on said housing means and bearing against said convex spherical draft load bearing surface for transferring draft loads therefrom to said center sill;

a rear support block having a tapered rear surface and a truncated concave substantially spherical buff load bearing surface adapted to engage with the convex buff load bearing surface of said butt end portion;

a gravity activated slack adjusting wedge for engaging the tapered surface of said rear support block;

a detachable bottom support casting mounted to said center sill for retaining said butt end portion within said housing means, said bottom support casting having concave surface means formed thereon which are alignable with said concave surface means formed on said housing means in order to provide a continuous concave surface which bears against the convex spherical draft load bearing surface for transferring draft loads from the convex spherical draft load bearing surface to said center sill; and means for detachably securing said bottom support casting to said center sill.

2. The assembly of claim 1 wherein said butt end portion further comprises upper and lower planar surfaces.

3. The assembly of claim 2 further comprising a through-bore passing through said butt end portion between said upper and lower planar surfaces, whereby air passing through said open bottom portion of said housing means passes through said through-bore and through spaces formed between the spaced side walls of said housing means and an outer surface of the butt end portion to at all times directly cool both the interior and the exterior of the butt end portion in order to resist friction-related heat damage to the assembly.

4. The assembly of claim 3 wherein each of said side walls carries a laterally inwardly protruding formation.

5. The assembly of claim 4 further comprising means formed on said bottom support casting and on said laterally inwardly protruding formations for providing interlocking connection between said bottom support casting and said laterally inwardly protruding formations.

6. The assembly of claim 5 wherein said means for providing interlocking connection comprise lug means formed on one of said bottom support casting and said laterally inwardly protruding formations and mating pocket means formed on the other of said bottom support casting and said laterally inwardly protruding formations.

7. The assembly of claim 6 further comprising a continuous tapered surface formed on said housing means and said bottom support casting exteriorly of said continuous concave surface.

*8. A slackless rotary drawbar coupler assembly for use in combination with a railway car having a center sill, said assembly comprising:*

*a drawbar having a shank portion extending to an enlarged truncated spherical butt end portion defining essentially convex spherical buff and draft load bearing surfaces, the shank portion projecting from said convex spherical draft load bearing surface;*

*housing means securable to such center sill for supporting said butt end portion therein, said housing means having a top wall, a rear wall and spaced side walls, said housing means further having an essentially open bottom portion;*

*concave surface means within said housing means adapted to bear against said convex spherical draft load bearing surface for transferring draft loads therebetween;*

*a rear support block having a tapered rear surface and a truncated concave substantially spherical buff load bearing surface adapted to engage with said convex buff load bearing surface of said butt end portion;*

*a gravity activated slack adjusting wedge for engaging the tapered surface of said rear support block;*

*a bottom support member detachably secured to said open bottom portion of said housing means for retaining said butt end portion within said housing means, said bottom support member having a concave surface means which is alignable with said concave surface means within said housing means in order to provide a continuous concave surface adapted to bear against the convex spherical load bearing surface for transferring loads therebetween.*

*9. A drawbar coupler assembly according to claim 8 wherein said butt end portion further comprises upper and lower planar surfaces.*

*10. A slackless rotary drawbar coupler assembly for use in combination with a railway car having a center sill, said assembly comprising:*

*a drawbar having a shank portion extending to an enlarged truncated spherical butt end portion defining essentially convex spherical buff and draft load bearing surfaces, the shank portion projecting from said convex spherical draft load bearing surface, said butt end portion having upper and lower planar surfaces;*

*housing means securable to such center sill for supporting said butt end portion therein, said housing means having a top wall, a rear wall and spaced side walls, said housing means further having an essentially open bottom portion;*

*concave surface means within said housing means adapted to bear against said convex spherical draft load bearing surface for transferring draft loads therebetween;*

*a rear support block having a tapered rear surface and a truncated concave substantially spherical buff load bearing surface adapted to engage with said convex buff load bearing surface of said butt end portion;*

*a gravity activated slack adjusting wedge for engaging the tapered surface of said rear support block;*

*a bottom support member detachably secured to said open bottom portion of said housing means for retaining said butt end portion within said housing means, said bottom support member having a concave surface means alignable with said concave surface means*

*within said housing means sufficient to provide a continuous concave surface adapted to bear against the convex spherical draft load bearing surface on said drawbar for transferring draft loads therebetween; and*

*a through-bore passing through said butt end portion between said upper and lower planar surfaces adapted to permit air circulation therethrough and reduce friction related heat within said assembly.*

*11. A drawbar coupler assembly according to claim 10 wherein each of said sidewalls carries a laterally inwardly protruding member.*

*12. A drawbar coupler assembly according to claim 11 further comprising means formed on said bottom support member and on said laterally inwardly protruding members for providing interlocking connections between said bottom support member and said laterally inwardly protruding members.*

*13. A drawbar coupler assembly according to claim 12 wherein said means for providing interlocking connections comprises lug means formed on one of said bottom support member and said laterally inwardly protruding members and mating pocket means formed on the other of said bottom support member and said laterally inwardly protruding members.*

*14. A drawbar coupler assembly according to claim 13 further comprising a continuous tapered surface formed on said housing means and said bottom support member exteriorly of said continuous concave surface.*

* * * * *